March 30, 1937. W. R. HAINSWORTH 2,075,437
DEFROSTING CONTROL FOR AUTOMATIC REFRIGERATORS
Filed Sept. 5, 1931
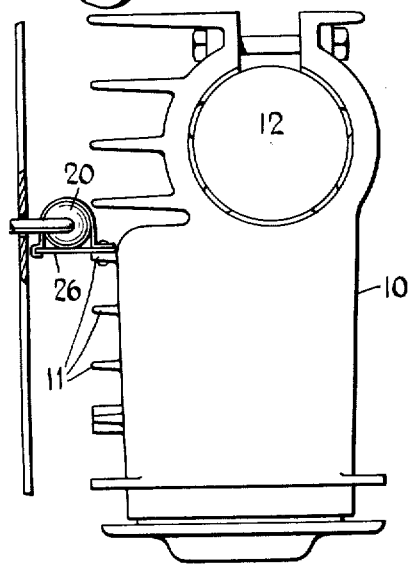
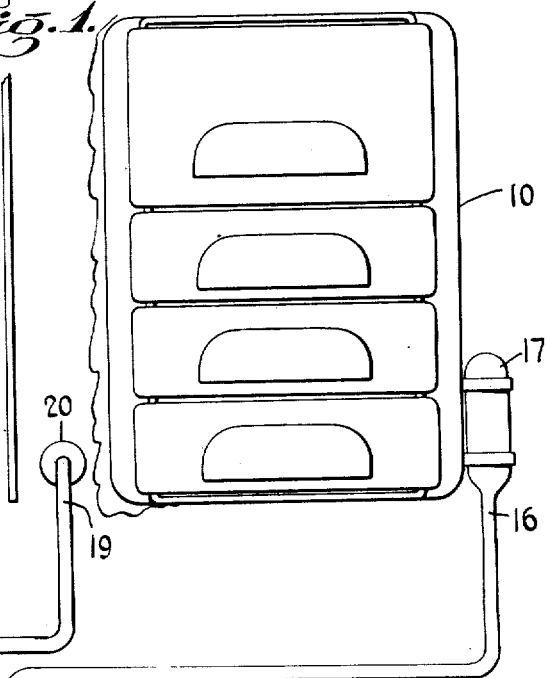
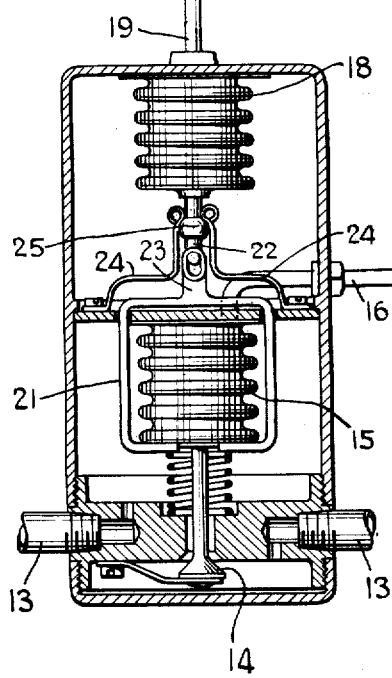
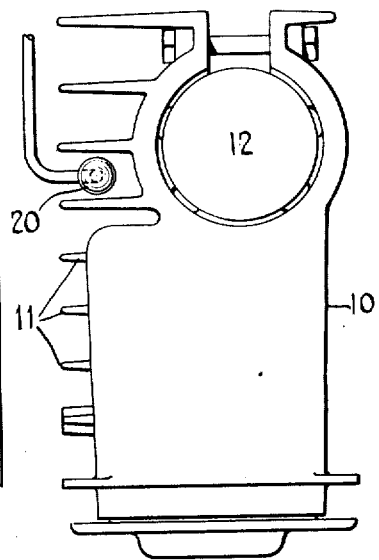
INVENTOR.
Wm. R. Hainsworth
BY
ATTORNEY Patented Mar. 30, 1937

2,075,437

UNITED STATES PATENT OFFICE 2,075,437

DEFROSTING CONTROL FOR AUTOMATIC REFRIGERATORS

William R. Hainsworth, Larchmont, N. Y., assignor, by mesne assignments, to Servel, Inc., a corporation of Delaware Application September 5, 1931, Serial No. 561,355

16 Claims. (Cl. 62—5)

This invention relates to automatic control means for defrosting the evaporator or cooling element of automatic refrigerators.

An object of this invention is to eliminate the necessity of manually shutting down a refrigerating machine periodically in order to remove the frost layer accumulated thereon by continued deposit of moisture from matter cooled.

According to this invention, the changes in temperature of or adjacent the cooling element due to the formation of frost are utilized to modify the effect of the means which normally controls operation of the apparatus to maintain the desired temperature of the cooling element and the interior of the refrigerator cabinet. This is accomplished in several ways. For example, the bulb of an expansible fluid thermostat is positioned a short distance from the evaporator and mounted so that there will be no direct conduction of heat to the evaporator. With air circulating around the bulb, it will remain at a higher temperature than the evaporator or cooling element, but as soon as the first layer builds up and bridges the space between the evaporator and the thermostat bulb, the latter becomes colder and the resulting decrease in pressure of the expansible fluid therein affords a suitable control factor for modifying the normal effect of the temperature control means.

The same result may be accomplished by locating the sensitive bulb of the thermostat in the path of air flowing through a channel or passageway in the cooling element. When frost builds up sufficiently to close or appreciably reduce the air flow through the channel or passageway, the temperature of the bulb will drop since it is no longer subjected to the warming influence of the air. A still further arrangement contemplates a fin or the like which extends from the evaporator or cooling element and on which the defrosting thermostat is mounted. As frost builds up the fin becomes insulated from the air circulating in the refrigerator cabinet and its temperature decreases in relation to the temperature in the thermostat bulb.

This invention will be more fully understood by reference to the following description taken in connection with the accompanying drawing, in which, Fig. 1 shows in vertical section a control arrangement contemplated by this invention applicable to an absorption type refrigerating system, the cooling element of which is shown in front elevation;

Fig. 2 is a plan view showing the defrosting thermostat bulb located in an air passage formed by fins on the cooling element; and Fig. 3 a similar view showing the defrosting thermostat bulb mounted on a fin extending from the cooling element.

Referring to Figs. 1 and 2 of the drawing, a cooling element 10 having a heat radiating surface formed by fins 11 is secured in good thermal exchange relation with the evaporator 12 of refrigerating apparatus of the continuous absorption type. Only the cooling element of the refrigerating apparatus is illustrated since refrigerating systems of this type are well known in the art and need no description. It will be appreciated that this invention is applicable to all types of refrigerators in which the cooling element is normally maintained within a predetermined temperature range at or below the freezing point of water and the control herein shown and described is merely illustrative. Referring again to Fig. 1 of the drawing, the temperature of the cooling element 10 is controlled by varying the heating of a generator, not shown, the burner of which is supplied with gas through conduit 13 in which there is a valve 14. This valve is controlled by an expansible fluid thermostat comprising a bellows 15 connected through a capillary tube 16 to a sensitive bulb 17 mounted directly on the cooling element 10. In accordance with this invention there is also provided a second expansible fluid thermostat, herein referred to as the defrosting thermostat, which comprises a bellows 18 connected through a capillary tube 19 to a sensitive bulb 20 which is spaced a slight distance from the cooling element 10. A yoke 21 adapted to close valve 14 when moved upwardly is connected to a stem 22 on the free end of the thermostat bellows 18 with a pin-and-slot connection 23. Spring members 24 engage a collar or cam 25 on stem 22 whereby the latter moves upwardly or downwardly with a snap action.

In operation, the temperature of the cooling element 10 is maintained substantially constant by control of the generator heating through thermostatically operated valve 14. Frost building up on the cooling element bridges the space between the latter and the defrosting thermostat bulb 20 whereby heat is conducted from the bulb to the evaporator and the temperature of the fluid in the bulb is decreased and therefore the pressure also. As the pressure in the thermostat bulb decreases, the bellows 18 contract until the cam 25 on the stem 22 is snapped past the spring members 24 to close the valve 14. Upon the closing of valve 14, the heating of the generator is decreased and therefore the temperature of the cooling element 10 increases to the melting temperature of the frost. As the latter melts, the span between the cooling element and the defrosting thermostat bulb 20 is of course broken and the temperature of the fluid in the bulb increases, and the pressure also. As the pressure increases the thermostat bellows 18 expands until the collar 25 is snapped downwardly past the spring members 24 and control of the valve 14 is returned to the normal control thermostat.

In Fig. 2 the sensitive bulb 20 of the defrosting thermostat is shown positioned in a channel formed by two of the fins 11 on the cooling element 10. With this arrangement, the temperature of the bulb 20 is maintained above the temperature of the cooling element by air passing downwardly between the fins. However, as frost builds up on the cooling element, the circulation of air over the bulb is cut off or reduced whereupon the temperature of the bulb decreases and the operation is the same as described in connection with Fig. 1.

In Fig. 3 the sensitive bulb 20 of the defrosting thermostat is shown secured on a thin fin 26 which is attached to the cooling element 10. The temperature of the fin and therefore the temperature of the bulb is greater than the temperature of the cooling element due to the circulation of warm air. However, as frost accumulates on the fin 26 the latter becomes insulated from the air whereby its temperature and therefore the temperature of the bulb 20 decreases with respect to the temperature of the normal control thermostat bulb and the operation is the same as described in connection with Fig. 1.

It will be obvious to those skilled in the art that various other changes may be made in the construction and arrangement without departing from the spirit of the invention and therefore the invention is not limited to what is described in the specification and shown in the drawing but only as indicated in the following claims.

I claim:

1. In refrigerating apparatus of the absorption type heated by a gas burner, a cooling element, a throttle valve in the burner supply line, an expansible fluid thermostat for controlling said valve responsive to the temperature of said cooling element, a second expansible fluid thermostat including a sensitive bulb slightly spaced from said cooling element, and a snap acting linkage connected between said second thermostat and said valve in such manner that the latter will be snapped closed upon operation of said second thermostat independently of the control of first said thermostat.

2. In refrigerating apparatus of the absorption type heated by a fluid fuel burner, a cooling element having a channel formed by fins on the surface thereof, a throttle valve in the burner supply line, an expansible fluid thermostat for controlling said valve responsive to the temperature of said cooling element, a second expansible fluid thermostat including a sensitive bulb positioned in the channel in said cooling element, and a snap acting linkage connected between said second thermostat and said valve in such manner that the latter will be snapped closed upon operation of said second thermostat independently of the control of first said thermostat.

3. In refrigerating apparatus of the absorption type heated by a fluid fuel burner, a cooling element having a fin extending from the surface thereof, a throttle valve in the burner supply line (an expansible fluid thermostat for controlling said valve responsive to the temperature of said cooling element, a second expansible fluid thermostat including a sensitive bulb mounted on the fin on said cooling element, and a snap acting linkage connected between said second thermostat and said valve in such manner that the latter will be snapped closed upon operation of said second thermostat independently of the control of first said thermostat.

4. In refrigerating apparatus of the absorption type heated by a fluid fuel burner, a throttle valve in the burner supply line, a cooling element, means for controlling said valve responsive to the temperature of said cooling element, and a thermostat slightly spaced from said cooling element and connected to close said valve independently of the control of said means.

5. In refrigerating apparatus of the absorption type heated by a fluid fuel burner, a valve in the burner supply line, a cooling element, means for controlling said valve responsive to the temperature of said cooling element, and temperature responsive means connected to close said valve independently of the control of first said means and including a member so positioned with respect to said cooling element that its temperature will be decreased by the formation of frost on said cooling element.

6. Refrigerating apparatus including a cooling element having a fin extending therefrom into air to be cooled by the cooling element, control means for normally maintaining the temperature of said cooling element within a predetermined range, and means for temporarily increasing the temperature of said cooling element responsive to increase in the quantity of frost on the latter including a thermostat thermally connected to said fin on the cooling element.

7. Refrigerating apparatus of the absorption type including heat input control means, a cooling element, means for operating said control means to normally maintain the temperature of said cooling element substantially at a predetermined value, and means to separately operate said control means to temporarily increase the temperature of said cooling element responsive to a predetermined increase in quantity of frost on the latter.

8. In an absorption type refrigeration apparatus, heat input control means, a cooling element, a thermostat for operating said contral means to normally maintain the temperature of said cooling element substantially constant, and a second thermostat connected to independently operate said control means to temporarily increase the temperature of said cooling element responsive to a predetermined increase in quantity of frost on the latter.

9. In an absorption type refrigeration apparatus, heat input control means, a cooling element having a fin extending therefrom, means for operating said control means to normally maintain the temperature of said cooling element substantially constant, and means to independently operate said control means to temporarily increase the temperature of said cooling element including a thermostat thermally connected to said fin on the cooling element.

10. In an absorption type refrigeration apparatus, heat input control means, a cooling element having a channel in the surface thereof, means for operating said control means to normally maintain the temperature of said cooling element substantially at a predetermined value, and means to independently operate said control means to temporarily increase the temperature of said cooling element including an expansible fluid thermostat having a sensitive bulb positioned in said channel in the cooling element.

11. In refrigeration apparatus of the continuous absorption type heated by a gas burner, a thermostatically operated valve for normally controlling the supply of gas to said burner to maintain the temperature of said cooling element at a substantially constant value, and a thermostat so positioned with respect to said cooling element that its temperature will be decreased by the formation of frost on said cooling element and operative to decrease the supply of gas to said burner independently of said normal control.

12. In refrigeration apparatus of the continuous absorption type, a cooling element, heat input control means operative to normally maintain the temperature of said cooling element substantially constant at a predetermined value, and a thermostat so arranged with respect to said cooling element that its temperature is decreased by the formation of frost on said cooling element and operative to temporarily increase the temperature of said cooling element above said predetermined value independently of said input control means.

13. Refrigeration apparatus including a cooling element, an energy supply control device, pressure operated means automatically operative to normally regulate said device to maintain said cooling element within a substantially constant temperature range, and additional pressure operated means also operative to operate said device to cause an increase in temperature of said cooling element above said range irrespective of the regulation effort of said first means, said additional means being constructed and arranged so that operation thereof is instigated upon accumulation of a predetermined amount of frost on said cooling element and operation thereof is terminated upon predetermined abnormal increase in temperature of said cooling element.

14. Refrigeration apparatus including a cooling element, an energy supply control device, an expansible fluid thermostat constructed and arranged to normally regulate said device to maintain said cooling element within a substantially constant temperature range, a second expansible fluid thermostat constructed and arranged to become operative upon predetermined decrease in temperature to operate said device to cause a temporary increase in temperature of said cooling element irrespective of the regulation effort of said first thermostat and including a sensitive bulb located with respect to said cooling element so that thermal transfer therebetween is increased responsive to formation of frost on said cooling element.

15. Refrigeration apparatus including a cooling unit, and apparatus for controlling flow of refrigerant in said unit comprising a primary energy control device, means for normally actuating said device including a bellows and a bulb responsive to temperature of said cooling element connected to said bellows, a second bellows, a second bulb spaced from said cooling unit and connected to said second bellows, said first and second bellows acting through common mechanism on said control device, and means whereby said second bellows is normally ineffective and is caused to take over actuation of said control device on attaining a low temperature due to accumulation of frost.

16. Refrigeration apparatus including a cooling unit, and apparatus for controlling flow of refrigerant in said unit comprising a primary energy control device, means for normally actuating said device including a bellows and a bulb responsive to temperature of said cooling element connected to said bellows, a second bellows, a second bulb spaced from said cooling unit and connected to said second bellows, said first and second bellows acting through common mechanism on said control device, means whereby said second bellows is normally ineffective and is caused to take over actuation of said control device on attaining a low temperature due to accumulation of frost, and snap action mechanism associated with said second bellows.

WILLIAM R. HAINSWORTH.

CERTIFICATE OF CORRECTION.

Patent No. 2,075,437.   March 30, 1937.

WILLIAM R. HAINSWORTH.

It is hereby certified that error appears in the printed specification of the above numbered patent requiring correction as follows: Page 1, first column, line 23, for the word "first" read frost; page 2, second column, line 3, claim 3, strike out the parenthesis before the word "an" and insert instead a comma; and that the said Letters Patent should be read with these corrections therein that the same may conform to the record of the case in the Patent Office.

Signed and sealed this 1st day of June, A. D. 1937.

(Seal)

Henry Van Arsdale
Acting Commissioner of Patents.

means for operating said control means to normally maintain the temperature of said cooling element substantially at a predetermined value, and means to independently operate said control means to temporarily increase the temperature of said cooling element including an expansible fluid thermostat having a sensitive bulb positioned in said channel in the cooling element.

11. In refrigeration apparatus of the continuous absorption type heated by a gas burner, a thermostatically operated valve for normally controlling the supply of gas to said burner to maintain the temperature of said cooling element at a substantially constant value, and a thermostat so positioned with respect to said cooling element that its temperature will be decreased by the formation of frost on said cooling element and operative to decrease the supply of gas to said burner independently of said normal control.

12. In refrigeration apparatus of the continuous absorption type, a cooling element, heat input control means operative to normally maintain the temperature of said cooling element substantially constant at a predetermined value, and a thermostat so arranged with respect to said cooling element that its temperature is decreased by the formation of frost on said cooling element and operative to temporarily increase the temperature of said cooling element above said predetermined value independently of said input control means.

13. Refrigeration apparatus including a cooling element, an energy supply control device, pressure operated means automatically operative to normally regulate said device to maintain said cooling element within a substantially constant temperature range, and additional pressure operated means also operative to operate said device to cause an increase in temperature of said cooling element above said range irrespective of the regulation effort of said first means, said additional means being constructed and arranged so that operation thereof is instigated upon accumulation of a predetermined amount of frost on said cooling element and operation thereof is terminated upon predetermined abnormal increase in temperature of said cooling element.

14. Refrigeration apparatus including a cooling element, an energy supply control device, an expansible fluid thermostat constructed and arranged to normally regulate said device to maintain said cooling element within a substantially constant temperature range, a second expansible fluid thermostat constructed and arranged to become operative upon predetermined decrease in temperature to operate said device to cause a temporary increase in temperature of said cooling element irrespective of the regulation effort of said first thermostat and including a sensitive bulb located with respect to said cooling element so that thermal transfer therebetween is increased responsive to formation of frost on said cooling element.

15. Refrigeration apparatus including a cooling unit, and apparatus for controlling flow of refrigerant in said unit comprising a primary energy control device, means for normally actuating said device including a bellows and a bulb responsive to temperature of said cooling element connected to said bellows, a second bellows, a second bulb spaced from said cooling unit and connected to said second bellows, said first and second bellows acting through common mechanism on said control device, and means whereby said second bellows is normally ineffective and is caused to take over actuation of said control device on attaining a low temperature due to accumulation of frost.

16. Refrigeration apparatus including a cooling unit, and apparatus for controlling flow of refrigerant in said unit comprising a primary energy control device, means for normally actuating said device including a bellows and a bulb responsive to temperature of said cooling element connected to said bellows, a second bellows, a second bulb spaced from said cooling unit and connected to said second bellows, said first and second bellows acting through common mechanism on said control device, means whereby said second bellows is normally ineffective and is caused to take over actuation of said control device on attaining a low temperature due to accumulation of frost, and snap action mechanism associated with said second bellows.

WILLIAM R. HAINSWORTH.

CERTIFICATE OF CORRECTION.

Patent No. 2,075,437. March 30, 1937.

WILLIAM R. HAINSWORTH.

It is hereby certified that error appears in the printed specification of the above numbered patent requiring correction as follows: Page 1, first column, line 23, for the word "first" read frost; page 2, second column, line 3, claim 3, strike out the parenthesis before the word "an" and insert instead a comma; and that the said Letters Patent should be read with these corrections therein that the same may conform to the record of the case in the Patent Office.

Signed and sealed this 1st day of June, A. D. 1937.

(Seal)

Henry Van Arsdale
Acting Commissioner of Patents.

CERTIFICATE OF CORRECTION.

Patent No. 2,075,437. March 30, 1937.

WILLIAM R. HAINSWORTH.

It is hereby certified that error appears in the printed specification of the above numbered patent requiring correction as follows: Page 1, first column, line 23, for the word "first" read frost; page 2, second column, line 3, claim 3, strike out the parenthesis before the word "an" and insert instead a comma; and that the said Letters Patent should be read with these corrections therein that the same may conform to the record of the case in the Patent Office.

Signed and sealed this 1st day of June, A. D. 1937.

(Seal)

Henry Van Arsdale
Acting Commissioner of Patents.